United States Patent
Song (10) Patent No.: US 10,443,842 B2
(45) Date of Patent: Oct. 15, 2019

(54) CONTROL METHOD USING VIBRATION CONTROL

(71) Applicant: DOOSAN HEAVY INDUSTRIES & CONSTRUCTION CO., LTD., Gyeongsangnam-do (KR)

(72) Inventor: Jin Woo Song, Gyeonggi-do (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 470 days.

(21) Appl. No.: 15/192,013

(22) Filed: Jun. 24, 2016

(65) Prior Publication Data

US 2016/0377285 A1 Dec. 29, 2016

(30) Foreign Application Priority Data

Jun. 25, 2015 (KR) .......................... 10-2015-0090605

(51) Int. Cl.
*F23N 1/02* (2006.01)
*F23R 3/00* (2006.01)
(Continued)

(52) U.S. Cl.
CPC .................. *F23N 1/02* (2013.01); *F02C 9/28* (2013.01); *F23N 5/02* (2013.01); *F23N 5/16* (2013.01);
(Continued)

(58) Field of Classification Search
CPC .. F02C 9/28; F05D 2260/964; F05D 2270/14; F23N 1/02; F23N 2037/02;
(Continued)

(56) References Cited

U.S. PATENT DOCUMENTS

| | | | |
|---|---|---|---|
| 7,302,334 B2* | 11/2007 | Hook | F02C 9/28 60/39.27 |
| 7,484,352 B2* | 2/2009 | Flohr | F23R 3/34 60/39.281 |

(Continued)

FOREIGN PATENT DOCUMENTS

| | | |
|---|---|---|
| EP | 1 286 031 A1 | 2/2003 |
| JP | 08-246903 A | 9/1996 |

(Continued)

OTHER PUBLICATIONS

Extended Search Report issued in corresponding European Application No. 16176121.8, dated Nov. 29, 2016, 8 pages.

(Continued)

*Primary Examiner* — Jesse S Bogue
(74) *Attorney, Agent, or Firm* — Invenstone Patent, LLC (57) ABSTRACT

The present disclosure provides a method for controlling combustor cans of a gas turbine. Detectors disposed on combustor cans are operable to detect combustion vibration values of the combustor cans. The combustion vibration value is compared to a reference value. Combustor cans having a combustion vibration value greater than a reference value are assigned to a first group, and combustor cans having a combustion vibration value not greater than the reference value are assigned to a second group. The output of each combustor can in the first group is regulated to lower the combustion vibration value, thereby improving the stability of the gas turbine.

18 Claims, 6 Drawing Sheets

(51) Int. Cl.
*F02C 9/28* (2006.01)
*F23N 5/02* (2006.01)
*F23N 5/16* (2006.01)
*F23N 5/24* (2006.01)

(52) U.S. Cl.
CPC .................. *F23N 5/24* (2013.01); *F23R 3/00* (2013.01); *F05D 2260/964* (2013.01); *F05D 2270/14* (2013.01); *F23N 2037/02* (2013.01); *F23N 2041/20* (2013.01); *F23R 2900/00013* (2013.01)

(58) Field of Classification Search
CPC .......... F23N 2041/20; F23N 5/02; F23N 5/16; F23N 5/24; F23R 2900/00013; F23R 3/00
See application file for complete search history.

(56) References Cited

U.S. PATENT DOCUMENTS

| | | | | |
|---|---|---|---|---|
| 7,503,177 | B2* | 3/2009 | Bland | F01D 21/003 60/772 |
| 7,513,117 | B2* | 4/2009 | Garay | F23R 3/34 431/1 |
| 7,654,092 | B2* | 2/2010 | Ryan | F02C 7/26 60/39.281 |
| 7,703,976 | B2* | 4/2010 | Henshaw | G01D 18/00 374/110 |
| 7,908,072 | B2 | 3/2011 | Tonno et al. | |
| 8,510,014 | B2* | 8/2013 | Nomura | F02C 9/18 60/208 |
| 8,894,408 | B2* | 11/2014 | Bulat | F02C 9/28 431/13 |
| 9,423,317 | B2* | 8/2016 | Frost | G01M 15/14 |
| 9,745,896 | B2* | 8/2017 | Crothers | F02C 9/18 |
| 9,909,508 | B2* | 3/2018 | Jaiven | F02C 9/28 |
| 2006/0032930 | A1* | 2/2006 | Glidden | F23N 1/022 236/15 A |
| 2006/0248893 | A1* | 11/2006 | Mick | F01D 21/003 60/772 |
| 2007/0062196 | A1* | 3/2007 | Gleeson | F23N 5/242 60/722 |
| 2009/0125207 | A1* | 5/2009 | Nomura | F02C 3/22 701/100 |
| 2011/0056180 | A1* | 3/2011 | Nomura | F02C 9/18 60/39.24 |
| 2012/0196234 | A1 | 8/2012 | Bulat et al. | |
| 2014/0200721 | A1 | 7/2014 | Rizkalla et al. | |

FOREIGN PATENT DOCUMENTS

| | | |
|---|---|---|
| JP | 09-269107 A | 10/1997 |
| JP | 2006-183652 A | 7/2006 |
| KR | 10-0275375 B1 | 12/2000 |
| KR | 10-1191548 B1 | 10/2012 |
| KR | 10-2014-0085691 A | 7/2014 |
| WO | 2014/115105 A1 | 7/2014 |

OTHER PUBLICATIONS

International Search Report issued in corresponding Application No. PCT/KR2016/006695, dated Sep. 22, 2016, 3 pages.

* cited by examiner

CONTROL METHOD USING VIBRATION CONTROL

CROSS-REFERENCE TO RELATED APPLICATIONS

This application claims priority to Korean Application No. 10-2015-0090605, filed Jun. 25, 2015, the contents of which are incorporated herein in their entirety.

BACKGROUND

The present disclosure relates to a gas turbine, and more particularly, to a method of controlling a gas turbine by regulating vibration of a combustor.

A gas turbine power plant of the related art determines an air flow rate and a fuel flow rate to be fed to a combustor according to a predetermined data, on the basis of the output of the generator, atmosphere temperature, and so forth, and operates a gas turbine by finely regulating the flow rates to proper values through a test run. However, a control device for the gas turbine power plant of the related art has a problem of immediately responding to variations in composition of the fuel, thereby lowering the combustion stability or generating combustion vibration.

It has been known from the combustor for the industrial gas turbine plant that the combustion vibration is generated when a heat cycle of combustion happening upon operation of the combustor is combined with an acoustic cycle of a combustion sound produced upon the combustion and returned from a combustor liner.

If the combustion vibration is generated above a reference value from the combustor, it impedes the safety operation of the gas turbine, as well as leading in mechanical damage. Accordingly, it is important to monitor the combustion vibration generated in the combustor for the industrial gas turbine plant in real time.

A method of controlling the combustion vibration according to the related art controls all the combustors at the same time (see Korea Patent No. 10-0275375). The above method is not efficient since the output of even the stable combustor is decreased.

BRIEF SUMMARY

Therefore, the present disclosure has been made in view of the above problems, and one object of the present disclosure is to provide a method of controlling a gas turbine by grouping combustors and effectively regulating combustion vibration, thereby reducing the combustion vibration and thus improving stability of the gas turbine. Generally, a method of controlling the gas turbine detects the vibration of the combustor, groups the combustor cans exceeding a referenced value, and regulates the output for each group.

To accomplish the above object, according to one aspect of the present disclosure, there is provided a method of controlling a combustor for an operating gas turbine. The method may include the steps: detecting of a combustion vibration value with a first detector provided to a plurality of combustor cans; comparing the combustion vibration value detected by the respective detectors and a predetermined reference value; grouping at least one combustor can, of which the combustion vibration value exceeds the reference value, to a first group, and at least one combustor can, of which the combustion vibration value does not exceed the reference value, to a second group; and controlling the first group by regulating an output with a control valve provided to the plurality of combustor cans, thereby lowering the combustion vibration value.

According to an embodiment of the present disclosure, in the output control step, the second group may not be controlled, or may be controlled to raise the output.

According to an embodiment of the present disclosure, the output control step may be to control an air-fuel ratio with the control valve.

According to an embodiment of the present disclosure, if a period of time has elapsed after the output control step, the group may be revoked, and the gas turbine may be controlled by repeating the detection step, the comparison step, the grouping step, and the output control step.

According to an aspect of the present disclosure, there is provided a method of controlling a combustor for an operating gas turbine, including the steps: detecting of a combustion vibration value with a first detector provided to a plurality of combustor cans; detecting of a temperature value with a second detector provided to the plurality of combustor cans; comparing the combustion vibration value detected by the respective first detectors and a predetermined reference value; comparing the temperature value detected by the respective second detectors and a predetermined reference value; grouping at least one combustor can, of which the combustion vibration value and the temperature value exceed the reference value, to a first group, and at least one combustor can, of which the combustion vibration value and the temperature value do not exceed the reference value, to a second group; and controlling the first group by regulating an output with a control valve provided to the plurality of combustor cans, thereby lowering the combustion vibration value.

According to an embodiment of the present disclosure, the method may further include grouping at least one combustor can of the second group, of which the combustion vibration value exceeds the reference and the temperature value does not exceed the reference value, to a third group, wherein the output control step controls the third group by regulating the output, thereby lowering the combustion vibration value.

According to an embodiment of the present disclosure, the method may further include grouping at least one combustor can of the second group, of which the combustion vibration value does not exceed the reference and the temperature value exceeds the reference value, to a fourth group, wherein the output control step controls the fourth group by regulating the output, thereby lowering the temperature value.

With the above configuration, the present disclosure groups and controls only the combustors exceeding the allowable combustion vibration value, thereby effectively controlling the gas turbine, raising the output thereof, and improving the stability.

DETAILED DESCRIPTION OF THE PREFERRED EMBODIMENTS

Hereinafter, embodiments of the present disclosure will be described in detail with reference to the accompanying drawings. In describing the embodiments of the present disclosure, the same reference numerals are used throughout the drawings to refer to the same elements, and redundant description thereof will omitted if necessary.

In addition, the expressions that mean ordinal numbers in the specification, such as "first," "second," "A," "B," "(a)," "(b)," and the like, are used for describing various constituent elements without imposing any limitation to the various constituent elements. The expressions that mean the ordinal numbers are used only for distinguishing among the constituent elements of the same kind. when one element is described as being "connected" or "coupled" to the other element, it should be understood that one element may be directly connected or coupled to the other element, but a third element may be interposed between the two elements. In contrast, when one element is described as being "directly connected" or "directly coupled" to the other element, it should be understood that a third element is not interposed between two elements.

Figure 1A:
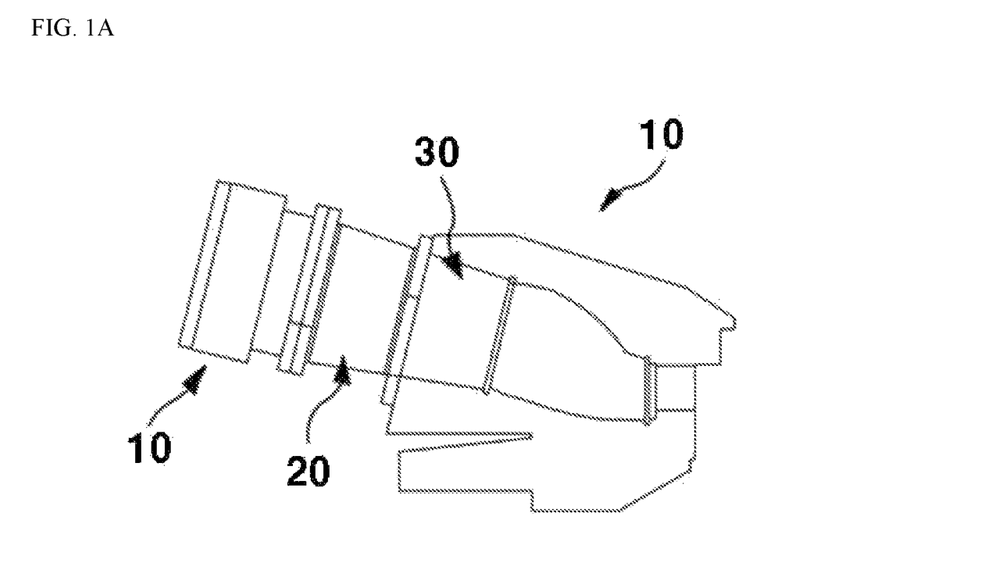
FIG. 1A is a side view of a combustor can.
Figure 1B:
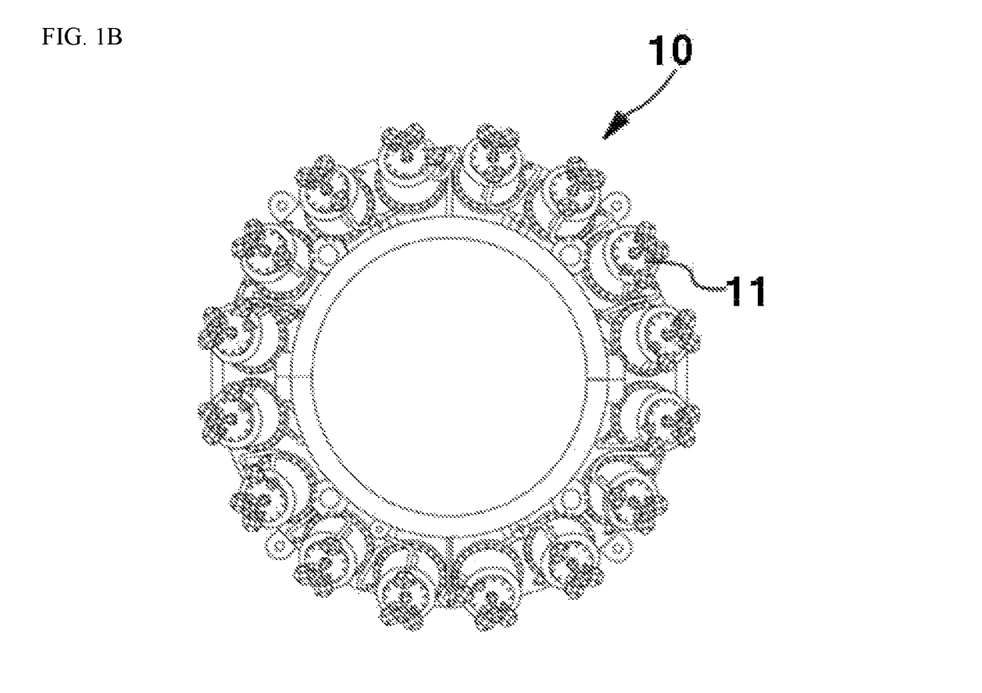
FIG. 1B is a perspective view illustrating engagement between a combustor for a general gas turbine and a plurality of combustor cans.

FIGS. 1A and 1B show a gas turbine combustor. FIG. 1A shows a gas turbine combustor 1 having a burner 10, a liner 20 and a transition piece 30. FIG. 1B shows the burner 10 having a plurality of combustor cans 11 coupled to an annular shape.

The positions and number of gas turbine combustors may be different from each other according to manufacturers or purposes of the gas turbine combustors. Also, even in the case where the plurality of combustor cans 11 are coupled to each other to take the annular shape, the number of combustor cans 11 may be different from each other. However, the control method according to the present disclosure is not limited to the structure of the combustor 1 or a specific shape to which the combustor is coupled and is thus applicable to a general gas turbine having the combustor 1 wherein the plurality of combustor cans 11 is coupled to each other.

Hereinafter, the characteristics of the present disclosure will be explained, and the hardware configuration related to the control method according to the present disclosure will be briefly discussed with reference to FIG. 2.

Figure 2:
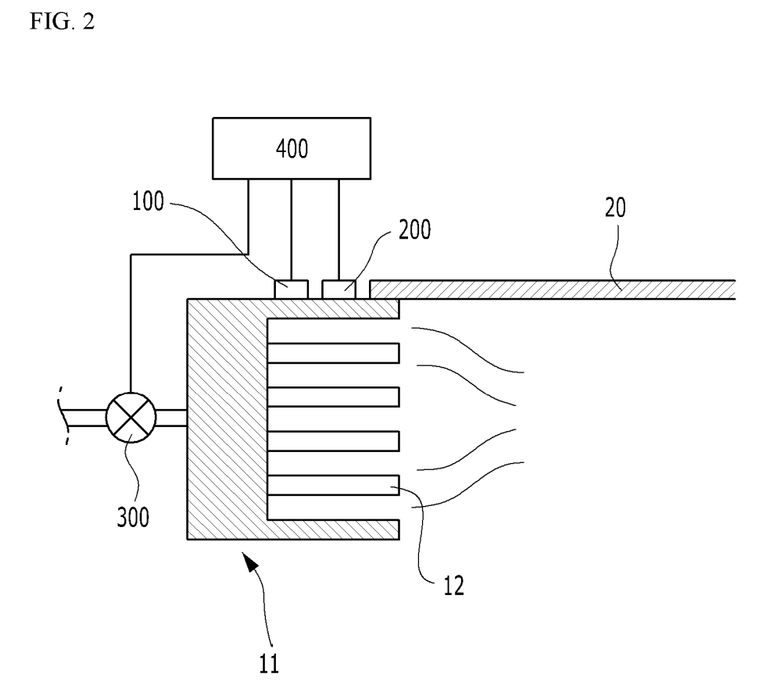
FIG. 2 is a schematic view illustrating a combustor can of a burner.

FIG. 2 shows any one of the plurality of combustor cans 11 of the burner 10. The combustor cans 11 may have the same structure as each other. Each combustor can 11 has a plurality of combustion nozzles 12 mounted therein, and fuel and compressed air whose flow rates are controlled by a control valve 300 are supplied to each combustion nozzle 12. The fuel injected from the combustion nozzles 12 is atomized by the compressed air and is then burnt in the internal space of the liner 20 constituting a combustion chamber.

Under the configuration of such a combustor, the present disclosure includes a first detector 100 that senses combustion vibrations, a second detector 200 that measures a temperature of each combustor can 11, and a controller 400 that processes and analyzes the signal values inputted from the first detector 100 and the second detector 200 through the operation and control functions thereof to control the operation of the control valve 300 according to the analyzed results. The control operation of the controller 400 will be explained in detail below.

In this case, the controller 400 receives the signals from the first detector 100 and the second detector 200 disposed in each combustor can 11 and may individually control the control valve 300 disposed on each combustor can 11. That is, it is possible to conduct individual control for each combustor can 11, and accordingly, some of the combustor cans 11 are controllable in the form of a group according to the objects of the present disclosure. The control of the combustor cans as the group will be discussed below.

According to the combustor of the gas turbine, the position, the number or the like of the combustion nozzles is different depending upon its application. Also, in the case where a plurality of combustors are arranged and coupled in an annular design, the number of combustors may be different from each other. However, the control method of the present disclosure is not limited to the structure of the combustor, or a specific coupling structure of the combustor, and thus can be applied to general gas turbine. Hereinafter, preferred embodiments will be described based on the premise.

According to the related art, a method of controlling the output of the gas turbine including a plurality of combustors which are coupled in an annular shape is carried out on the whole combustors as a unit. Specifically, if combustion vibration or temperature is detected to be above a maximum allowable value in the combustor cans, only a specific combustor is not controlled, but the output of the whole combustor cans is controlled to be lowered. There is a problem in that since the output of the combustor cans which are normally operated within the maximum allowable value is lowered, the entire operation efficiency of the gas turbine is generally lowered.

Therefore, the present disclosure provides a method of controlling the gas turbine by grouping the combustors of which the combustion vibration or the temperature is above a reference value, thereby raising the output of the gas turbine and improving the combustion safety. To this end, each combustor is provided with a detector and a control valve.

Figure 3:
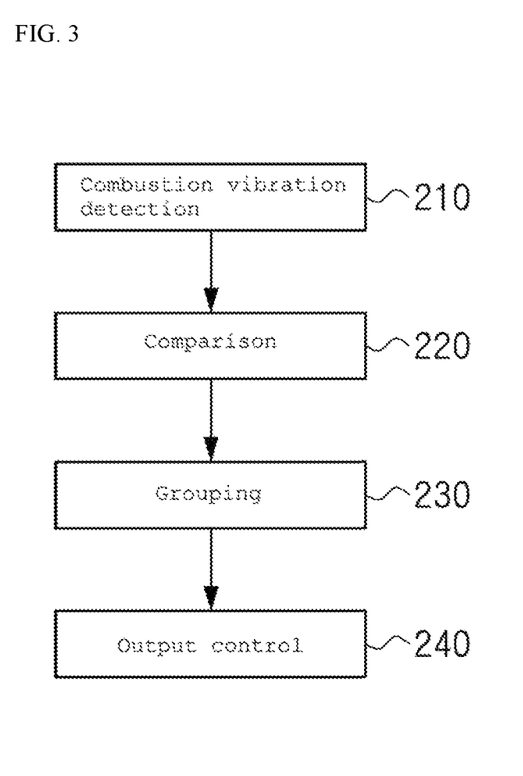
FIG. 3 is a block diagram illustrating a control method using a combustion vibration value according to an embodiment of the present disclosure.

FIG. 3 is a block diagram illustrating a method of controlling combustors for a gas turbine according to an embodiment of the present disclosure. Referring to the drawing, the control method mainly includes a detection step 210, a comparison step 220, a grouping step 230, and an output control step 240.

The detection step 210 is to obtain a combustion vibration value by a plurality of first detectors provided to plurality of combustor cans. Each first detector may be separately installed to each of the respective combustor cans. The first detector can be positioned at any of a combustion nozzle, a liner, or a transition piece in order to detect the combustion vibration. According to circumstances, a plurality of subsidiary detectors may be provided to one combustor can. In this instance, the first detector may calculate measured combustion vibration values of the corresponding combustor can as an average value of the subsidiary detectors, and can calculate a representative value according to specific criteria.

If the combustion vibration value for every combustor can is measured by the first detector, the respective combustion vibration values is compared with a predetermined reference value (step 220). The predetermined reference value is a stable numerical range or an allowable range which can be applied to the gas turbine of interest. It is determined by comparing the combustion vibration value calculated by the first detector and the reference value whether the combustion vibration value is within a normal value or not. The predetermined reference value is a value variably set depending upon the performance and structure of the gas turbine, fuel characteristics, atmosphere temperature, pressure and so forth.

After it is determined by the comparison whether the combustor can shows a stable combustion vibration, it proceeds to the grouping step 230. A grouping standard is whether the combustion vibration of the combustor can exceeds the reference value or not. The combustor cans are divided into one group of which the combustion vibration exceeds the reference value, and another group of which the combustion vibration does not exceed the reference value. After the combustor cans are grouped, the combustor cans in corresponding groups are considered as one unit, and the group proceeds to the output control step 240 as a unit.

Since each combustor can has a separate control valve, the group of combustor cans which exceed the reference value is controlled by lowering the output, thereby decreasing the vibration value. Meanwhile, the group of combustor cans which do not exceed the reference value does not have its control adjusted.

Figure 4:
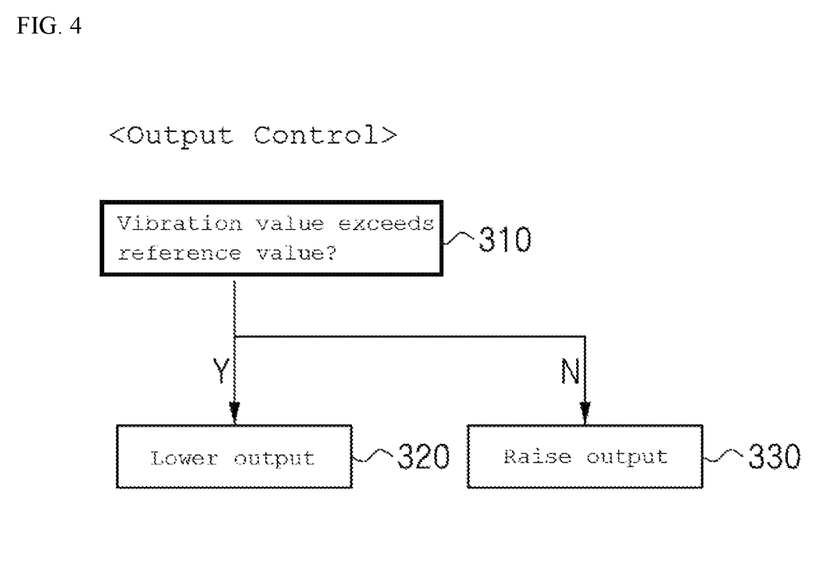
FIG. 4 is a block diagram illustrating an output control step using the combustion vibration value.

FIG. 4 is a block diagram illustrating an example of the output control step. Referring to FIG. 4, if the combustor cans which are set to any group exceeding the reference value (step 310), the group which exceeds the reference value is controlled to lower the output (step 320). The group which does not exceed the reference value is controlled to raise the output (step 330).

Since the group of combustor cans which do not exceed the reference value means that it has a margin to raise the output by the reference value, the output thereof can be controlled to be raised. Therefore, the group exceeding the reference value is controlled to lower the output, thereby improving the stability of the gas turbine, and the group not exceeding the reference value is controlled to raise the output, thereby improving the efficiency of the gas turbine.

The control method of lowering or raising the output is achieved by use of the control valve which is provided to the respective combustor cans. The output can be raised or lowered by regulating an air-fuel ratio fed to the combustor with each control valve. As the output is raised, the combustion vibration value and the temperature value are increased. As the output is lowered, the combustion vibration value and the temperature value are decreased. The output control has been described hereinbefore.

If a period of time has elapsed after the output control step, the group may be reset/revoked and the disclosed combustor regulation method repeated. Specifically, after a set period of time, the detection step, comparison step, and the grouping step should be repeatedly carried out so as to continuously manage the gas turbine. This continuous repetition is important because a combustor group that had previously exceeded the reference value could have been adjusted so that its lowered output decreases the efficiency of the gas turbine, even though the combustor group is now within the stable range. Also, a combustor group that had its output increased could end up with a vibration value greater than the reference value. Accordingly, if a period of time has elapsed, each group should be reset/revoked, and then the detection step, the comparison step, and the regrouping step should repeatedly be carried out so as to continuously manage the gas turbine.

Figure 5:
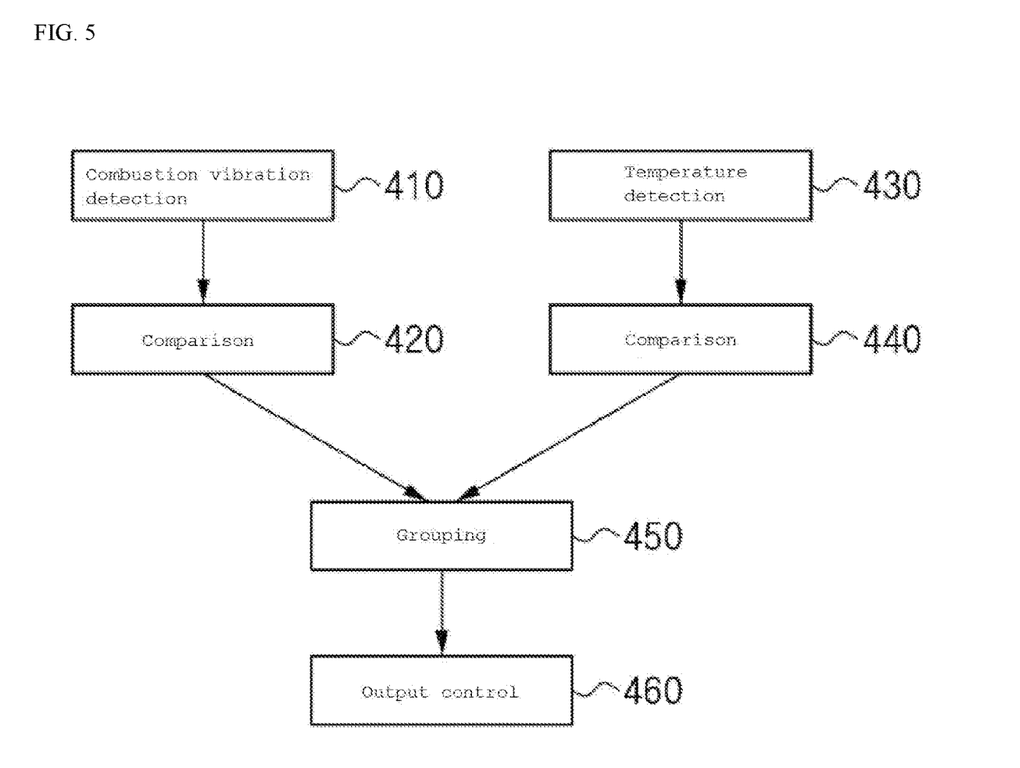
FIG. 5 is a block diagram illustrating a control method using a combustion vibration value and a temperature value according to another embodiment of the present disclosure.

FIG. 5 is a block diagram illustrating a method of controlling combustors for a gas turbine according to another embodiment of the present disclosure. Referring to the drawing, the control method mainly includes detection steps 410 and 430, comparison steps 420 and 440, grouping steps 450, and an output control step 460.

The first detection step 410 is to obtain a combustion vibration value by a plurality of first detectors provided to a plurality of combustor cans. Each first detector may be separately installed to each of the respective combustor cans. The first detector can be positioned at any of a combustion nozzle, a liner, or a transition piece in order to detect the combustion vibration. According to circumstances, a plurality of first subsidiary detectors may be provided to one combustor can. In this instance, the first detector may calculate measured combustion vibration values of the corresponding combustor can as an average value of the first subsidiary detectors, and can calculate a representative value according to specific criteria.

The second detection step 430 obtains a temperature value by a plurality of second detectors provided to the plurality of combustor cans. Each second detector may be separately installed to each of the respective combustor cans. The second detector can be positioned at any of the combustion nozzle, the liner, or the transition piece in order to detect the temperature. According to circumstances, a plurality of second subsidiary detectors may be provided to one combustor can. In this instance, the second detector may calculate measured temperature values of the corresponding combustor can as an average value of the second subsidiary detectors, and can calculate a representative value according to specific criteria. It is further noted that a single subsidiary detector may collect both combustion vibration and temperature, in lieu of having separate and distinct first and second subsidiary detectors.

When the combustion vibration value for every combustor can is calculated by the first detector, the respective combustion vibration values is compared with a predetermined reference value (step 420). The predetermined reference value is a stable numerical range or an allowable range which can be applied to the gas turbine of interest. By comparing the combustion vibration value calculated by the first detector and the reference value, it can be determined whether the combustion vibration value is within a normal value or not. The predetermined reference value is a value variably set depending upon the performance and structure of the gas turbine, fuel characteristics, atmosphere temperature, pressure and so forth.

When the temperature value for every combustor can is calculated by the second detector, the respective combustion vibration values is compared with a predetermined temperature reference value (step 440). The predetermined temperature reference value is a stable numerical range or an allowable range which can be applied to the gas turbine of interest. By comparing the temperature value calculated by the second detector and the reference temperature value, it can be determined whether the temperature value is within a normal value or not. The predetermined temperature reference value is a value variably set depending upon the performance and structure of the gas turbine, fuel characteristics, atmosphere temperature, pressure and so forth.

After it is determined by the comparison whether the combustor can shows the stable combustion vibration and the stable temperature, it proceeds to the grouping step 450.

A grouping standard is whether the combustion vibration and the temperature of the combustor can respectively exceed the reference value or not, and the combustor cans are divided into one group exceeding both reference values, and the other group not exceeding both reference values. After the combustor cans are grouped, the combustor cans corresponding to the group are considered as one unit, and the group proceeds to the output control step 460 as a unit.

Since each combustor can has a separate control valve, the group of combustor cans exceeding both reference values is controlled by lowering the output, thereby decreasing the vibration and temperature value. Meanwhile, the group of combustor cans not exceeding both reference values does not have its output lowered. (step 460)

Figure 6:
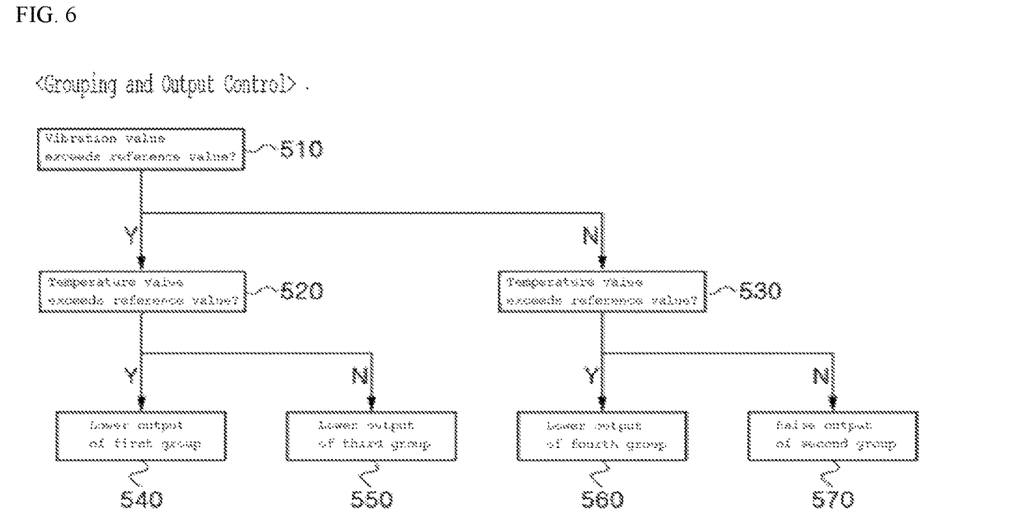
FIG. 6 is a block diagram illustrating a grouping step and an output control step using the combustion vibration value and a temperature value.

FIG. 6 is a block diagram illustrating the grouping step and the output control step. Referring to FIG. 6, in the case of controlling the gas turbine by detecting the combustion vibration value and the temperature value, the group can be subdivided to control the output. It proceeds to a step 510 of determining whether the combustion vibration value exceeds the reference value (step 510), and the combustor cans are divided into one group exceeding the reference value and the other group not exceeding the reference value. A group of combustor cans, of which the combustion vibration value exceeds the reference value, proceeds to a step 520 of determining whether the temperature value exceeds the temperature reference value. If the temperature value of this combustor can group exceed the temperature reference value, the group is set to a first group (step 540). Alternatively, if the temperature value of this combustor can group does not exceed the reference value, it is set to a third group (step 550).

A group of combustor cans, of which the combustion vibration value does not exceed the reference value, proceeds to a step 530 of determining whether the temperature value exceeds the temperature reference value (530). If the temperature value of this combustor can group exceed the temperature reference value, the group is set to a fourth group (step 560). Alternatively, if the temperature value of this combustor can group does not exceed the reference value, it is set to a second group (step 570).

As a result of the above disclosed control method, the combustor cans corresponding to the stable range, of which the combustion vibration value and the temperature value are less than the reference value, are set to the second group, and are controlled to raise the output (step 570). The first group, the third group, and the fourth group, of which the combustion vibration value or the temperature value are above the reference value, are controlled to lower the output (steps 540, 550, and 560).

If both the combustion vibration value and the temperature value are used, the combustor cans can be finely divided and grouped, relative to the case where the group is set only by use of the combustion vibration value. Therefore, the group can be controlled to operate the gas turbine in the more stable manner.

In the case of controlling the gas turbine using the combustion vibration value and the temperature value, if a period of time has elapsed after the output control step, the group may be reset. The gas turbine can be controlled by repeating the detection step, the comparison step, the grouping step, and the output control step. If the group is not again set, there is a problem in that even through the group exceeding the reference value is within the stable range, the output may still be lowered, thereby decreasing the efficiency of the gas turbine. Also, there is another problem in that the group not exceeding the reference value is not controlled, and then will exceed the reference value later. In addition, in the case of controlling the output to raise, the output will continuously be raised, so that the combustion vibration value will exceed the reference value.

Accordingly, if a period of time has elapsed, the preset group should be revoked, and then the detection step, the comparison step, and the regrouping step should repeatedly be carried out so as to continuously manage the gas turbine.

It is to be noted that the technical terms used in this specification should be construed as having meanings that are commonly understood by those skilled in the art to which the present disclosure pertains unless especially defined as different meanings otherwise in this specification, and should not be construed as having excessively comprehensive meanings or excessively reduced meanings. Furthermore, if the technical terms used in this specification are wrong technical terms that do not precisely represent the spirit of the present disclosure, they should be replaced with technical terms that may be correctly understood by those skilled in the art and understood. Furthermore, an expression of the singular number used in this specification includes an expression of the plural number unless clearly defined otherwise in the context. In this application, terms, such as "comprise" and "include", should not be construed as essentially including all several elements or several steps described in the specification, but the terms may be construed as not including some of the elements or steps or as including additional element or steps. Additionally, the term "coupled", "couple" or "coupling" should be construed to mean either "connected directly", or "connected indirectly".

Those skilled in the art may change and modify the present disclosure in various ways without departing from the essential characteristic of the present disclosure. Accordingly, the disclosed embodiments should not be construed as limiting the technical spirit of the present disclosure, but should be construed as illustrating the technical spirit of the present disclosure. The scope of the technical spirit of the present disclosure is not restricted by the embodiments, and the scope of the present disclosure should be interpreted based on the following appended claims. Accordingly, the present disclosure should be construed as covering all modifications or variations derived from the meaning and scope of the appended claims and their equivalents.

Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provide d in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method for controlling a gas turbine, the method comprising:
    detecting a combustion vibration value of each of a plurality of combustor cans respectively coupled to a plurality of control valves, each control valve configured to control an output of power from a corresponding combustor can of the plurality of combustion cans by controlling a ratio of compressed air and fuel supplied to the corresponding combustor can;
    detecting a temperature value of each of the plurality of combustor cans;
    comparing the detected combustion vibration value of each of the plurality of combustor cans to a predetermined reference value;
    comparing the detected temperature value of each of the plurality of combustor cans to a predetermined temperature reference value;
    grouping, into a first group, combustor cans of the plurality of combustor cans having combustion vibration values greater than the predetermined reference value;
    grouping, into a second group, combustor cans of the plurality of combustor cans having combustion vibration values not greater than the predetermined reference value and having temperature values not greater than the predetermined temperature reference value;
    increasing the output of power of each of the combustor cans of the second group by controlling the plurality of control valves; and
    decreasing the output of power of each of the combustor cans of the plurality of combustor cans not included in the second group by controlling the plurality of control valves.

2. The method according to claim 1, wherein the combustion vibration value detecting detects a vibration present at an external surface of one of a combustion nozzle, a liner, or a transition piece.

3. The method according to claim 1, further comprising grouping, into a third group, combustor cans of the plurality of combustor cans having combustion vibration values greater than the predetermined reference value and having temperature values not greater than the predetermined temperature reference value; and
    controlling the output of power of each of the combustor cans of the third group to lower the combustion vibration values of the combustor cans of the third group.

4. The method according to claim 1, further comprising grouping, into a fourth group, combustor cans of the plurality of combustor cans having combustion vibration values not greater than the predetermined reference value and having temperature values greater than the predetermined temperature reference value; and
    controlling the output of power of each of the combustor cans of the fourth group to lower the temperature values of the combustor cans of the fourth group.

5. The method according to claim 1, further comprising controlling the output of power of each of the combustor cans of the first group to lower the combustion vibration values of the combustor cans of the first group, wherein the first group of combustor cans includes combustor cans of the plurality of combustor cans having temperature values greater than the predetermined temperature reference value.

6. The method according to claim 1, further comprising:
    revoking the combustor can grouping after a period of time has passed;
    detecting a new combustion vibration value for each of the plurality of combustor cans;
    detecting a new temperature value for each of the plurality of combustor cans;
    comparing each new combustion vibration value to the predetermined reference value;
    comparing each new temperature value to the predetermined temperature reference value;
    grouping, into a new first group, combustor cans of the plurality of combustor cans having new combustion vibration values greater than the predetermined reference value and having new temperature values greater the predetermined temperature reference value; and
    grouping, into a new second group, combustor cans of the plurality of combustor cans having new combustion vibration values not greater than the predetermined reference value and having new temperature values not greater than the predetermined temperature reference value,
    wherein the output increasing includes controlling the output of power of each of the combustor cans of the new second group, and the output decreasing includes controlling the output of power of each of the combustor cans of the plurality of combustor cans not included in the new second group.

7. The method according to claim 6, wherein the new first group of combustor cans includes combustor cans of the plurality of combustor cans having new temperature values greater than the predetermined temperature reference value, and wherein the output of power of each of the combustor cans of the new first group is controlled to lower the combustion vibration values of the combustor cans of the new first group.

8. The method according to claim 1, further comprising:
    revoking the combustor can grouping after a period of time has passed;
    detecting a new combustion vibration value for each of the plurality of combustor cans;
    detecting a new temperature value for each of the plurality of combustor cans;
    comparing each new combustion vibration value to the predetermined reference value;
    comparing each new temperature value to the predetermined temperature reference value; and
    grouping, into a new third group, combustor cans of the plurality of combustor cans having new combustion vibration values greater than the predetermined reference value and having new temperature values not greater than the predetermined temperature reference value,
    wherein the output of power of each of the combustor cans of the new third group is controlled to lower the new combustion vibration values of the combustor cans of the new third group.

9. The method according to claim 1, further comprising:
    revoking the combustor can grouping after a period of time has passed;
    detecting a new combustion vibration value for each of the plurality of combustor cans;
    detecting a new temperature value for each of the plurality of combustor cans;

comparing each new combustion vibration value to the predetermined reference value;

comparing each new temperature value to the predetermined temperature reference value; and grouping, into a new fourth group, combustor cans of the plurality of combustor cans having new combustion vibration values not greater than the predetermined reference value and having new temperature values greater than the predetermined temperature reference value, wherein the output of power of each of the combustor cans of the new fourth group is controlled to lower the new temperature values of the combustor cans of the new fourth group.

10. A control assembly for a gas turbine including a plurality of combustion cans, the control assembly comprising:

a first detector coupled to each of the plurality of combustion cans, the first detector operable to detect a combustion vibration value of a corresponding combustor can of the plurality of combustion cans;

a second detector coupled to each of the plurality of combustion cans, the second detector operable to detect a temperature value of a corresponding combustor can of the plurality of combustion cans;

a control valve coupled to each of the plurality of combustion cans, the control valve operable to control an output of power from a corresponding combustor can of the plurality of combustion cans by controlling a ratio of compressed air and fuel supplied to the corresponding combustor can; and a controller configured to compare the detected combustion vibration value of each of the plurality of combustor cans to a predetermined reference value, compare the detected temperature value of each of the plurality of combustor cans to a predetermined temperature reference value, group, into a first group, combustor cans of the plurality of combustor cans having combustion vibration values greater than the predetermined reference value, group, into a second group, combustor cans of the plurality of combustor cans having combustion vibration values not greater than the predetermined reference value and having temperature values not greater than the predetermined temperature reference value, increase the output of power of each of the combustor cans of the second group by controlling the control valves coupled to the plurality of combustion cans, and decrease the output of power of each of the combustor cans of the plurality of combustion cans not included in the second group by controlling the control valves coupled to the plurality of combustion cans.

11. The control assembly according to claim 10, wherein the first detector is disposed in an external surface of one of a combustion nozzle, a liner, or a transition piece in order to detect a vibration present at the external surface.

12. The control assembly according to claim 10, further comprising:

a plurality of subsidiary detectors coupled to each combustor can, each of the plurality of subsidiary detectors operable to detect local vibration of a corresponding combustor can of the plurality of combustion cans, wherein the combustion vibration value is an average of vibration values of the plurality of subsidiary detectors.

13. The control assembly according to claim 12, wherein the controller is further configured to group, into a third group, combustor cans of the plurality of combustor cans having combustion vibration values greater than the predetermined reference value and having temperature values not greater than the predetermined temperature reference value, and control the output of power of each of the combustor cans of the third group to lower the combustion vibration values of the combustor cans of the third group.

14. The control assembly according to claim 10, wherein the controller is further configured to group, into a fourth group, combustor cans of the plurality of combustor cans having combustion vibration values not greater than the predetermined reference value and having temperature values greater than the predetermined temperature reference value, and control the output of power of each of the combustor cans of the fourth group to lower the temperature values of the combustor cans of the fourth group.

15. The control assembly according to claim 10, wherein the controller is further configured to control the output of power of each of the combustor cans of the first group to lower the combustion vibration values of the combustor cans of the first group, wherein the first group of combustor cans includes combustor cans of the plurality of combustor cans having temperature values greater than the predetermined temperature reference value.

16. A control assembly for a gas turbine including a plurality of combustion cans, the control assembly comprising:

a first detector coupled to each of the plurality of combustion cans, the first detector operable to detect a combustion vibration value of a corresponding combustor can of the plurality of combustion cans;

a second detector coupled to each of the plurality of combustion cans, the second detector operable to detect a temperature value of a corresponding combustor can of the plurality of combustion cans;

a control valve coupled to each of the plurality of combustion cans, the control valve operable to control an output of power from a corresponding combustor can of the plurality of combustion cans by controlling a ratio of compressed air and fuel supplied to the corresponding combustor can; and a controller configured to compare the detected combustion vibration value of each of the plurality of combustor cans to a predetermined reference value, compare the detected temperature value of each of the plurality of combustor cans to a predetermined temperature reference value, group, into a first group, combustor cans of the plurality of combustor cans having combustion vibration values greater than the predetermined reference value, group, into a second group, combustor cans of the plurality of combustor cans having combustion vibration values not greater than the predetermined reference value and having temperature values not greater than the predetermined temperature reference value, group, into a third group, combustor cans of the plurality of combustor cans having combustion vibration values greater than the predetermined reference value and having temperature values not greater than the predetermined temperature reference value, group, into a fourth group, combustor cans of the plurality of combustor cans having combustion vibration values not greater than the predetermined reference value and having temperature values greater than the predetermined temperature reference value, increase the output of power of each of the combustor cans of the second group by controlling the control valves coupled to the plurality of combustion cans, and decrease the output of power of each of the combustor cans of the first, third and fourth groups by controlling the control valves coupled to the plurality of combustion cans.

17. The control assembly according to claim 16, wherein the controller is further configured to control the output of power of each of the combustor cans of the third group to lower the combustion vibration values of the combustor cans of the third group, control the output of power of each of the combustor cans of the fourth group to lower the temperature values of the combustor cans of the fourth group, and control the output of power of each of the combustor cans of the first group to lower the combustion vibration values of the combustor cans of the first group, wherein the first group of combustor cans includes combustor cans of the plurality of combustor cans having temperature values greater than the predetermined temperature reference value.

18. The control assembly according to claim 16, wherein the first detector is disposed in an external surface of one of a combustion nozzle, a liner, or a transition piece in order to detect a vibration present at the external surface.

* * * * *